Oct. 31, 1933.  E. TRACHSEL  1,932,649
POWER BRAKE FOR MOTOR VEHICLES
Filed Nov. 18, 1930
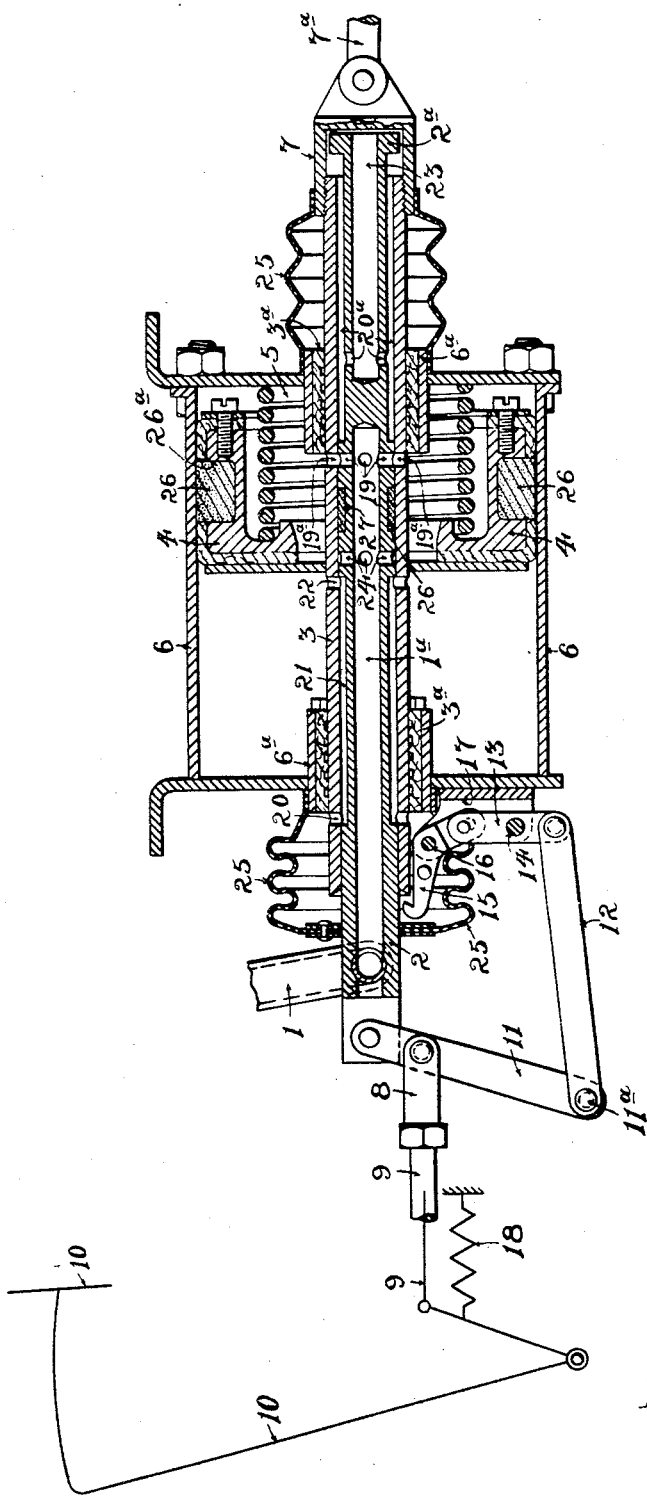
Inventor:
Ernst Trachsel
By His Attorney:-

Patented Oct. 31, 1933

1,932,649

UNITED STATES PATENT OFFICE 1,932,649

POWER BRAKE FOR MOTOR VEHICLES

Ernst Trachsel, Zurich, Switzerland, assignor of one-half to Walther Huessy, Aarburg, Switzerland Application November 18, 1930, Serial No. 496,401, and in Germany August 25, 1930

2 Claims. (Cl. 188—2)

The invention has reference to brake systems for motor vehicles and more specifically to braking systems wherein a piston sliding within a cylinder is provided, a brake applying spring at one side of the piston being compressed by the latter when the brakes are in the released position, such spring being released when it is desired to apply the brake. Differential pressure on the piston serves to compress the spring and to release it.

Undesired release of the pressure which at any moment is serving to maintain the spring in the compressed condition has the result that the brakes are applied. In the usual environment of mechanism of this type and especially where vacuum is employed, it is advisable to ensure that without positively holding the spring in compressed condition such spring should be effectively prevented from expanding unless positively required to do so. According to this present invention there is associated with a valve slide member which is movable to apply as desired the differential pressure to the piston, a check pawl which, whilst serving as an effective check on movement of a brake rod on such undesired pressure release, will be moved at each initial valve opening movement of such valve slide, and automatically returned to operative position on the reverse valve slide movement.

The invention with practical mechanical details is shown by way of example in the annexed drawing which is a longitudinal section of the brake device and will now be fully described.

In the drawing 1 indicates a flexible pipe which is in communication with the engine induction and also with the interior bore 1a of a slide member 2 which slides within a member which as it is interposed between a brake pedal lever and the brakes may be referred to as a brake rod 3 on which is fixed a piston 4 having connected thereto a spring 5 in a cylinder 6. The slide member 2 has a flange 2a on the end thereof and a cap 7 fixed upon the end of the member 3 serves to connect the said member to a brake rod or lever 7a which actuates the brakes. The various brake system rods need not be shown or described; they are well known. A fork 8 and connection 9 serve to connect a brake pedal 10 with a lever system of which 11 on which the fork 8 is pivoted as shown is articulated to the slide member 2 at one end and at the other end at 11a to a link 12 which connects the lever 11 with a further lever 13 fulcrumed at 14 in a bracket 17 and engaging by pin and slot connection a bell crank lever 15 fulcrumed at 16 the upper arm of which bell crank lever is hooked to form a pawl.

A strong spring 18 anchored at one end to a fixed part as shown and at the other end to the brake pedal 10, serves to keep the parts in the brakes off position, which is the position seen in the drawing.

The operation of the device is as follows:—

If the brakes are off the pawl is in the position shown, and thus any undesired movement of the braking device is checked. The spring-containing compartment of the cylinder 6 is in communication with the engine induction by the pipe 1, the bore 1a of slide 2, and ports 19 and 19a in the slide member 2 and member 3, and a continuous partial vacuum is thus created in that compartment to retract the spring 5. The other side of the piston 4 is open to atmospheric pressure through ports 20, 21 and 22.

Now if braking is to be effected the brake pedal 10 is pressed and the lever system 11, 12 and 13 moves to the left thus lowering the pawl. The slide member 2 is moved to the left, and ports 19 come out of register with ports 19a. Ports 20a, open to atmosphere through a bore 23 in the slide member 2, come into register with ports 19a and the vacuum in the spring compartment of cylinder 6 is broken and the spring 5 released by movement of the piston 4 to the left. This movement in the example given is expedited by ports 24 coming into register with ports 22 thus putting the left hand compartment of the cylinder 6 into communication with the engine induction and causing a partial vacuum in that compartment. Ports 20 and 21 are simultaneously closed by the slide member movement. The latter movement brings the flange 2a into contact with the end of the brake rod continuation member 3 and thus any further pressure on the pedal 10 will superimpose upon the servo braking already effected the full braking pressure of the foot of the driver on pedal 10, with the leverage determined by the position of the fork 8 on the lever 11 in relation to the now fixed fulcrum point 11a.

To release the brakes the pedal 10 is released and under the pull of spring 18 the whole apparatus resumes the position shown in the drawing, with the original position of the various ports in relation to the engine induction and to the atmospheric pressure seen in that drawing.

Dust covers 25 formed of leather or other suitable flexible material are provided to enclose those parts of the slide members 2 and 3 which project from the ends of the cylinder 6.

The piston 4 is lubricated by means of solid lubricant 26 charged in the peripheral recess 26a and the bearings 6a may be lubricated by for instance leather sleeves 3a which have been soaked in tallow. Solid lubricant 26 may be charged in the peripheral recess 27 of the slide 2.

I claim:—

1. In a braking system a cylinder and piston, a tubular brake rod member on which the piston is mounted, a spring normally compressed by the piston to maintain the brakes in released position, a tubular valve slide member sliding within the brake rod member and having a flexible connection to a means for applying differential pressure to the piston, a check pawl for the brake rod member, a brake pedal, and operative connection between the brake pedal, the check pawl, and valve slide member.

2. In a braking system a cylinder and piston, a tubular brake rod member on which the piston is mounted, a spring normally compressed by the piston to maintain the brakes in released position, a tubular valve slide member sliding within the brake rod member and having a flexible connection to a means for applying differential pressure to the piston, a check pawl for the brake rod member, a brake pedal, and a lever transmission between the brake pedal on the one hand and the valve slide member and check pawl on the other hand.

ERNST TRACHSEL.